United States Patent

[11] 3,569,811

| [72] | Inventors | Lalan G. Miller;<br>John M. Mills, Pittsburgh, Pa. |
|---|---|---|
| [21] | Appl. No. | 818,887 |
| [22] | Filed | Apr. 24, 1969 |
| [45] | Patented | Mar. 9, 1971 |
| [73] | Assignee | Westinghouse Electric Corporation<br>Pittsburgh, Pa. |

[54] DYNAMIC BRAKING SYSTEM
20 Claims, 4 Drawing Figs.

| [52] | U.S. Cl. | 318/381,<br>318/367, 318/369 |
|---|---|---|
| [51] | Int. Cl. | H02p 3/06 |
| [50] | Field of Search | 318/367,<br>368, 371, 375—381 |

[56] References Cited
UNITED STATES PATENTS
2,447,666  8/1970  Purifoy.................  318/381

Primary Examiner—Benjamin Dobeck
Assistant Examiner—Thomas Langer
Attorneys—F. H. Henson, R. G. Brodahl and C. J. Paznokas ABSTRACT: There is disclosed an arrangement for controlling dynamic braking of a vehicle traction motor system wherein the effective average dynamic braking resistance is adjustable between predetermined minimum and maximum values, and wherein the motor field system is operated in full field mode or partial field mode, depending on whether commanded (requested) braking current at a given speed is greater or less than a predetermined value which for the given speed is at least that which would obtain in the full field mode and with the maximum effective average dynamic braking resistance in the circuit.

3,569,811

DYNAMIC BRAKING SYSTEM

BACKGROUND OF THE INVENTION

In the operation of a traction motor dynamic braking system, it is necessary to be able to vary the armature current between low and high values in accordance with requested braking effort between low and high values, at all speeds. This presents a problem in systems wherein adjustable braking circuit resistance is provided by a controllable chopper connected across at least a portion of a dynamic braking resistor, especially in the case where braking currents lower than those obtainable with the lowest chopper ON/OFF ratio are desired at high vehicle speeds.

One way of accomplishing this is to increase the resistance of the portion of the dynamic braking resistor across which the chopper is connected. The immediate drawback of such an arrangement at high speeds is the increase of the voltage across the chopper during the OFF (nonconducting) intervals of the chopper. This requires higher rated chopper elements to safely withstand the voltages experienced.

Another way of reducing the braking current below the minimum obtainable with maximum effective average resistance in the circuit (that is with the chopper ON/OFF ratio at the lowest) is to reduce the motor field strength per unit current applied to the field system. This may be done by shunting the field winding or by switching a tapped field winding to reduce the turns or to effect bucking turns. However it is not desirable to brake with both high and low braking current demand at all speeds with reduced field strength per unit current applied to the field system because for a given braking effort more braking current is required at reduced field strength. This is especially objectionable at higher speeds.

SUMMARY OF THE INVENTION

The invention is directed to a method of and apparatus for selectively operating the motor field system of a vehicle traction motor in the dynamic braking mode at a first field strength or lesser second field strength (per unit current available to the field system) depending on the vehicle speed and the requested value of braking current. Operation at the higher field strength may be referred to as either high field mode or full field mode, while operation at the lower field strength may be referred to as either low field mode or partial field mode.

In accordance with one embodiment of the invention, signals which are functions of vehicle speed and the requested current are employed to (1) connect a shunt across the motor field when the requested current at a given speed is lower than a predetermined value that is not less than the value of current which would be provided at that speed with unshunted field and maximum effective average braking resistance in the motor circuit, and (2) disconnect the shunt when the requested current value at a given speed is higher than a predetermined value that is not less than the current value which would be provided at that speed with unshunted field and maximum effective average braking resistance in the motor circuit.

Other and further objects and advantages of the invention will be apparent from the following detailed description taken in connection with the drawings which illustrate preferred embodiments of the invention.

DRAWINGS

DESCRIPTION OF THE PREFERRED EMBODIMENT

Figure 1:
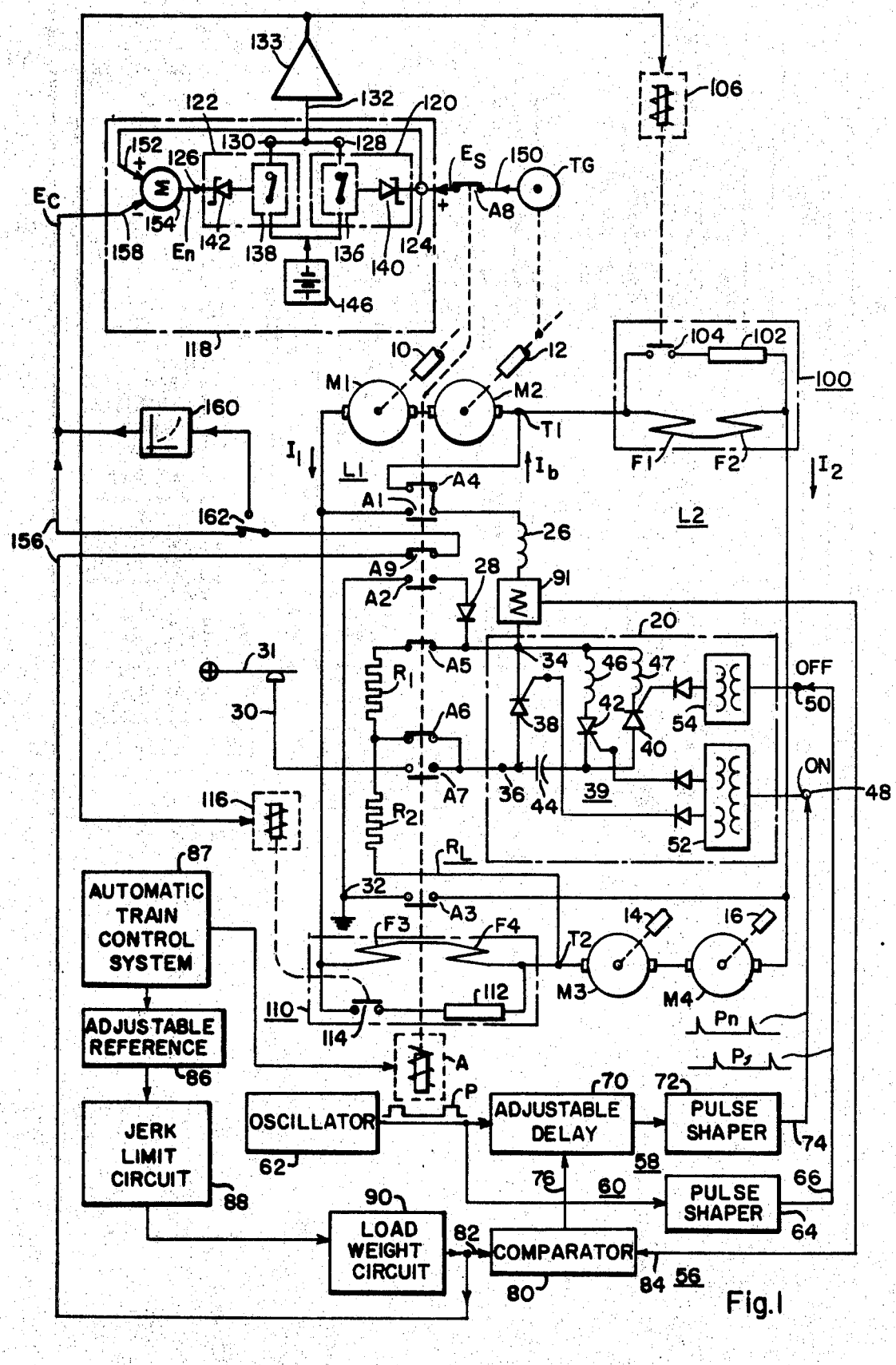
FIG. 1 is a diagram of a vehicle traction motor system embodying the invention.

In FIG. 1, M1, M2, M3 and M4 designate DC motors having field windings F1, F2, F3 and F4 respectively. The armatures of the motors are shown coupled to driving axles 10, 12, 14 and 16 of a vehicle, for example, a rapid transit car. A chopper type ON-OFF current controller is shown at 20, and dynamic braking resistors are indicated at $R_1$ and $R_2$. Item 26 is a reactor.

The above described components are selectively connectable as a DC series motor system in either motoring mode or braking mode by switching operations effected by contact sets A1, A2, A3, A4, A5, A6 and A7 of a relay A controlled by an automatic train control system 87. Relay A is shown unenergized, in which condition contacts A1, A2, A3 and A7 are open, while contacts A4, A5 and A6 are closed.

With contacts A4, A5 and A6 closed as shown, the motor circuit is connected in dynamic braking configuration, that is the motor circuit is set up for braking. The braking circuit thus set up consists of two loop circuits L1 and L2, each containing the armatures of two of the motors and the field windings of the other two motors with a common load branch $R_L$ connected between terminals T1 and T2. The load branch $R_L$ includes a relatively large resistor $R_1$, a relatively smaller resistor $R_2$ and other elements. In braking, the motors are driven as generators by the vehicle and current circulates in each of the loop circuits L1 and L2 through the braking resistor ($R_1 + R_2$ and modifications thereof) the braking effort being determined by the motor current. In this configuration, the motors operate effectively as series DC generators.

The chopper 20 is connected across resistor $R_1$ so that when the chopper is turned on, resistor $R_1$ is shunted or bypassed, and when the chopper is turned off, resistor $R_1$ is reinserted in the circuit. The average braking current, and consequently the braking effort, is controlled by time-ratio control of the ON-OFF times (periods) of the chopper, that is by controlling the difference between the length of the OFF periods and the length of the ON periods of the chopper.

When relay A is energized contacts A4, A5 and A6 open to open the braking circuit, and contacts A1, A2, A3 and A7 close to connect the motor circuit components in the motoring configuration, that is to set up the circuit for traction. In the motoring configuration, motors M1 and M2 are connected in series with their fields F1 and F2, and motors M3 and M4 are connected and M4 are connected in series with their fields F3 and F4. The two pairs of series connected motors are connected in parallel. The chopper 20 is connected in series with the motor network between a power input line 30 and another power input line 32 or ground. The specific location of the chopper 20 in the circuit is between the input line 30 and the motor system. Thus, the chopper 20 is effectively in series with the line 30 and in position to control power applied to the motor system through the line 30 when the latter is connected to a power supply source. In the motoring configuration, reactor 26 is connected in series between the chopper 20 and the motors to smooth the motor current. Through contacts A2, diode 28 is connected across the motor and reactor 26 to provide the well-known free wheeling function.

Basically, a chopper is a switch which is operated off and on (opened and closed) rapidly. Utilizing a chopper as a control element, a circuit may be controlled by controlling the ratio of ON time to OFF time of the chopper. Thus, the average current in a line may be controlled by inserting a chopper in series in the line and controlling the ratio between the lengths of successive ON and OFF periods of the chopper.

The particular chopper 20 shown by way of example, is provided with main terminals 34 and 36, and further includes a thyristor 38 for carrying main load current between terminals 34 and 36 when turned on. A commutating circuit 39 is connected across the cathode-anode path of thyristor 38 for commutating or turning off thyristor 38 in response to an OFF signal supplied to the chopper. The commutating circuit 39 includes thyristors 40 and 42, a capacitor 44 and a reactor 46, interconnected as shown. A protective reactor 47 is inserted in series with the cathode of thyristor 40 for the protection of that thyristor. The chopper is provided with respective ON and OFF input lines 48 and 50, respectively, line 48 being connected to the gate circuits of thyristors 38 and 42 through a pulse transformer 52, while line 50 is connected to the gate circuit of thyristor 40 through a pulse transformer 54. For isolation, the gates of thyristors 38 and 40 are fed from separate secondaries of transformer 52. It will be appreciated that the gate circuits of the thyristors are simplified so that protection networks and control connections to the thyristor cathodes are not shown. Likewise single line symbolic technique is used in illustrating the input and output lines of transformers 52 and 54, and the later described circuits for providing the control ON and OFF pulses to the chopper 20.

In considering the operation of the chopper 20 per se, assume that there is power in the circuit in which the main chopper terminals 34 and 36 are connected. To start the chopper, thyristor 40 is first turned on by a pulse supplied to its gate, thus charging capacitor 44 through thyristor 40 from the power applied to the main input terminals 34 and 36 of the chopper. When capacitor 44 becomes charged, the current through thyristor 40 goes to zero and that thyristor turns off. The chopper is then ready for operation and is turned on by simultaneously firing thyristors 38 and 42 in response to gate signals applied thereto. This does two things. It connects the power circuit of the motor (braking or motoring configuration) through thyristor 38. Simultaneously, it sets up an oscillatory circuit consisting of capacitor 44 and reactor 46. Current will flow from the capacitor through thyristor 38 into inductor 46 and then from the inductor back through thyristor 42 to the capacitor with voltage on the capacitor then reversed. Thyristor 42 turns off when the current through it goes to zero. Thyristor 38 will remain conducting (ON). The chopper is now in its ON or conductive condition with substantially full motor current (braking or motoring) flowing through thyristor 38.

To turn the chopper off, thyristor 40 is again turned on, thus applying the reverse charge of capacitor 44 as a back-bias across thyristor 38 thereby turning thyristor 38 off. This of course turns the chopper 20 off. The capacitor 44 will again charge through thyristor 40 from the motor circuit. By controlling the gate pulses applied to thyristors 38, 40 and 42, the chopper 20 can be turned on and off rapidly in successive intervals to effect a desired average ON time and thereby provide a desired control of the power circuit (braking and motoring).

When the motor circuit is connected in motoring configuration (relay A energized), and power is applied to lines 30 and 32, the average motor current is controlled by controlling the ON-OFF time-ratio of the chopper, that is by controlling the ratio of ON time to OFF time. It may be noted that when chopper 20 is ON, the diode 28 is in the blocking direction with respect to line voltage so that no current flows through it. However, when the chopper is OFF, the diode 28 provides a path for the inductive motor current, forming a loop circuit through the motors, the diode 28 and reactor 26 so that the motor current decays at a rate determined by the constants of the circuit.

In order to control the average motor current for either braking or motoring, time-ratio control of the chopper may be effected in a number of ways. Time-ratio control, that is control of the ratio of the length of the ON periods to the length of the OFF periods, may be effected by (a) providing constant frequency output pulses (ON periods) while varying either the leading or the trailing edges of the ON pulses or both, or (b) varying the frequency of constant length ON periods, or, (c) varying the lengths of the ON and the OFF periods as needed. Method (a) is known as pulse width modulation, method (b) is known as variable frequency control while method (c) which has some of the characteristics of both (a) and (b) is known as ripple control. It may be noted that ripple control of a similar chopper in connection with similar motor circuits is disclosed in U.S. Pat. application Ser. No. 711,109, filed Mar. 6, 1968, by John M. Mills entitled "CONTROL SYSTEM FOR TRACTION MOTORS," and assigned to the same assignee as the present application. Although the present invention may be practiced with any mode of time-ratio control, the specific example disclosed herein is in connection with pulse width modulation by control of the leading edge of constant frequency output pulses (ON periods) of the chopper.

A control circuit 56 (shown in single-line diagram) generates control signals for providing pulse width modulation type of time-ratio control of the chopper 20 in accordance with commands representing desired braking or motoring efforts. The control circuit 56 has two channels 58 and 60 supplied with constant frequency pulses P from a common pulse generator 62, for example a suitable square wave oscillator. The frequency or repetition rate of the oscillator pulses P may for example be 200 per second. Channel 60 includes a pulse shaper 64 and an output line 66 for supplying OFF pulses $Pf$ to the OFF input line 50 of chopper 20. Channel 58 includes a phase controller 70, a pulse shaper 72 and an output line 74 along which ON pulses $Pn$ are supplied to the ON input line 48 of the chopper 20. Pulse shapers 64 and 72 are employed to suitably shape the pulses for use as firing pulses for the thyristors of the chopper 20. The pulse shapers may for example be differentiators. Although pulses $Pn$ and $Pf$ are of the same shape and frequency, their phase relations are adjustable by the phase shifter 70, which by way of example is shown as an adjustable delay that is controllable by signals applied through a control line 76.

As hereinbefore explained, the ON time (length of ON period) of the chopper 20 extends from the time an ON signal is received by the chopper on line 48 to the time an OFF signal is received on line 50. From this it is apparent that by changing the phase relations between the ON pulses $Pn$ and the OFF pulses $Pf$, the average ON time of the chopper and therefore the average current in the motor circuit in either motoring or braking mode may be controlled as desired.

The phase adjuster 70 is any suitable device which will control the phase of pulses $Pn$ in channel 58 relative to the pulse $Pf$ in channel 60 in response to suitable control signals applied to the control input line 76 of the phase shifter 70. By way of example, the phase shifter 70 is shown as a signal responsive adjustable delay, that will delay pulses passing therethrough in accordance with the value of a control input signal received on line 76. Line 76 is connected to the output of an error generator or comparator 80 which produces an output signal that is a function of the difference between the respective input signals applied to input lines 82 and 84 of the comparator 80. By way of example comparator 80 may be a summing device such as an operational amplifier for providing an output signal on line 76 that is proportional to the difference between the signals applied to the respective input lines 82 and 84. Signals representing desired (commanded) motor current for traction or braking are supplied to line 82 by an arrangement including an adjustable reference signal source 86 which may be part of an automatic system such as a train or vehicle control system 87, or it may be a manually adjustable source. The control signal supplied by the reference source 86 may be in the form of voltage or current, the magnitude of which represents the desired traction effort or the desired braking effort, to obtain the desired rate of acceleration or deceleration as the case may be. The speed and braking and the rates of acceleration or deceleration of the vehicle, therefore are controlled by adjusting the magnitude of the control signal supplied by the reference 86.

It will be understood that the control signal may change abruptly to change the rate of acceleration, or to change from acceleration to braking, and since the type of motor control system described herein is capable of following changes in the control signal almost instantaneously, it is desirable that the rate of change of the control signal be limited to an acceptable value for the safety and comfort of passengers in the vehicle. For this purpose the control signal supplied by the reference 86 may be modified by a jerk limit circuit 88. This circuit may be of any suitable type which is capable of limiting the rate of change of the control signal to an acceptable maximum and of providing an output signal representing the control signal as so modified. Although any suitable circuit of this type may be employed, a preferred circuit is shown in a copending application of L. G. Miller, Ser. No. 711,103, filed Mar. 6, 1968, entitled "Jerk Limit Circuit For Traction Motor Control Systems," and assigned to the assignee of the present patent application.

It will also be appreciated that the necessary tractive effort or braking effort for a desired rate of acceleration or deceleration varied with the weight of the vehicle, and it is therefore desirable to further modify the control signal so that the motor current actually maintained will be that required to produce the desired rate of acceleration or deceleration with the particular load or weight of the car at a particular time. The control signal from the reference source 86 may therefore be further modified by a load weight circuit 90 which measures the weight of the car and modified the control signal accordingly. Such circuits are known in the art, but a circuit particularly suitable for this type of control system is disclosed in another copending application of L. G. Miller, Ser. No. 711,002, filed Mar. 6, 1968, and entitled "Load Weight Circuit For Traction Motor Control Systems," and assigned to the assignee of the present application. Thus the reference signal from source 86, modified by the circuits 88 and 90, is applied to the input line 82 of the comparator as a control signal representing the motor current necessary to obtain the acceleration rate or deceleration rate called for by the command signal from the reference source 86. Actually, the signal on line 82 is a net command signal representing the value of motor current necessary to produce desired tractive or braking effort.

A signal whose value is proportional to actual motor current is applied to the comparator 80 for comparison with the signal on line 82 representing desired (commanded) motor current. The actual motor current signal is derived from a suitable current sensor 91 in the motor system, and applied to the input line 84 of the comparator 80. Although any suitable current sensing scheme may be employed, a suitable example of a system for producing a signal proportional to actual motor current is described in the aforesaid U.S. Pat. application Ser. No. 711,109. Comparator 80 produces an output signal on line 76 which is proportioned to the difference between desired motor current and actual motor current. The comparator output signal on line 76 is thus indicative of the amount and direction of error between desired and actual motor current. The signals on line 76 are applied to the control circuits of the adjustable delay 70 to adjust the delay and therefore the phase relations between pulses $Pn$ and $Pf$ in accordance with the direction and magnitude of the error to provide the necessary increase or reduction of the motor current as the error dictates in order to reduce the error.

Relay A is shown in the unenergized state. Therefore, the system thus far described is shown in the braking mode, in which case, the average effective dynamic braking resistance and consequently the average motor current is dependent on the average ON time of the chopper 20 which in turn is dependent on the particular setting of the adjustable reference 86 representing a commanded or desired braking effort. Thus the average effective dynamic braking resistance varies from the sum of resistances $R_1$ and $R_2$ to the value of resistor $R_2$ alone, thus ranging between maximum and minimum values of resistance. The maximum resistance value corresponds to $R_1$ plus $R_2$ when the chopper ON/OFF ratio is at minimum, while the minimum resistance corresponds to resistor $R_2$ alone which occurs when the average ON time of the chopper is at the maximum.

In the braking mode the motors M1, M2, M3 and M4 operate as generators. The terminal voltage of the generating system appears at points T1 and T2, and the load $R_L$ on the system connected between terminals T1 and T2 includes in series portions $R_2$ and $R_3$ of the dynamic braking resistance, where $R_3$ is the average effective resistance provided by the combination of resistor $R_1$ and the chopper. The elements 26 and 91 are not significant elements of the load. The load current flowing from terminal T1 to terminal T2 through resistor $R_L$ may alternatively be referred to as armature current or braking current. It is symbolized by the arrow labeled $I_b$, the arrow pointing in the direction of the current flow. The current $I_b$ is the sum of currents $I_1$ and $I_2$ (indicated by arrows so labeled) which is the total of the armature current. Currents $I_1$ and $I_2$ are the currents of loops L1 and L2, respectively.

Figure 2:
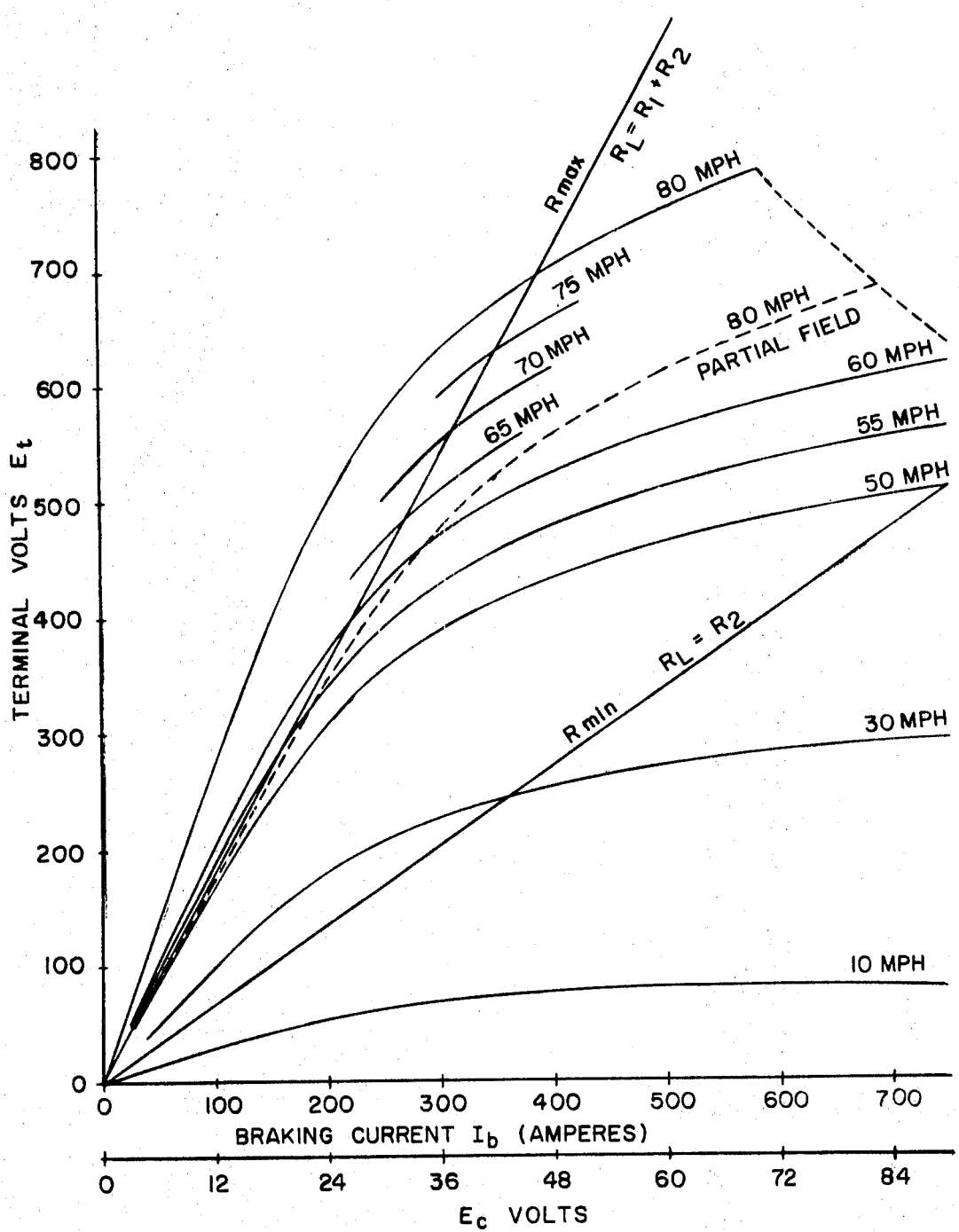
FIGS. 2 and 3 are graphs that are useful in understanding the operation of the apparatus.

Examples of certain characteristics of the motor system operating as a generator, that is in the braking mode, are shown in FIG. 2 wherein a family of curves illustrate the relation between terminal voltage $E_t$ (voltage across terminals T1 and T2) and braking current $I_b$ at various vehicle speeds. It should be understood that the particular values shown are by way of example and may fit either a system of motors or a single motor in a dynamic braking circuit. The terminal voltage $E_t$ is dependent on vehicle speed S, field strength C and the machine constant K. Thus $E_t = KCS$. Braking current $I_b$, which also is the total armature current is dependent on the terminal voltage $E_t$ and the resistance of the common load circuit $R_L$ consisting of $R_3$ and $R_2$ in series, where $R_3$ is the average effective resistance due to the combination of $R_1$ and the status of the chopper 20 thereacross. Elements 26 and 91 may be ignored from the braking load standpoint. As hereinbefore indicated the resistance of load $R_L$ ranges from a maximum $R_1 + R_2$ to a minimum $R_2$ alone. It may be noted at this point that braking effort is the negative torque at the wheels and it is directly proportional to armature current and the field flux and the machine constants.

The resistance value of $R_2$ may be chosen to provide for fadeout of dynamic braking at the desired fadeout speed, that is with the chopper 20 at its maximum average ON time, dynamic braking will begin to fade at a speed determined by $R_2$ and $R_1$ with the chopper maximum average ON time. For example $R_2$ may be 0.68 ohms which is based on a fadeout speed of about 37 m.p.h. with 500 ampere braking current. A desirable selection for the resistance value of $R_1$ is that which will give the maximum braking current $I_b$ required at the maximum vehicle speed with the chopper 20 minimum average ON time. In the example $R_1$ is chosen at 1.12 ohms so that when added to the 0.68 ohms of $R_2$ the total for $R_L$ maximum resistance will be 1.8 ohms. This provides that minimum braking effort can be obtained with minimum average chopper ON time at 80 m.p.h. while operating in the later described partial field mode.

In FIG. 2, curve $R_{max}$ is the load line for the maximum value of $R_L$, which as indicated occurs when $R_L$ equals $R_1 + R_2$, which in turn occurs when the chopper 20 is OFF and stays OFF (at lowest chopper average ON time). Thus the volt-ampere values for any given speed with maximum $R_L$ occur at the given speed volt-ampere curve intercept of the load line $R_{max}$. The $I_b$ values at the load line $R_{max}$ intercepts of the various speed $E_t - I_b$ curves, are the lowest braking current values obtainable by the system since they occur with the chopper at the lowest average ON time. For example at 80 m.p.h. (miles per hour) the lowest braking current $I_b$ obtainable is approximately 390 amperes, and at 60 m.p.h. the minimum value of braking current $I_1$ is approximately 225 amperes. Only the $R_{max}$ intercepts of the 65, 70 and 75 m.p.h. curves are shown. It should be noted that the volt-ampere curves for speeds of 50 m.p.h. and less do not cross the load line $R_{max}$. Thus for speeds of 50 m.p.h. and less the minimum load or braking current obtainable with maximum resistance in the circuit (that is chopper with minimum average ON time) is substantially zero. From FIG. 2, it is seen that for any given speed above about 52 m.p.h. the braking current $I_b$ cannot be reduced below the minimum value defined by the intersection of the load line $R_{max}$ of FIG. 2. The interpretation of curve B is that the current values $I_b$ of all speed-ampere relations falling within the area above this curve are less than the minimum obtainable when $R_L = R_1 + R_2$, that is, with the chopper at lowest average ON time. Curve B may be aptly referred to as the "-speed-minimum current curve."

Figure 3:
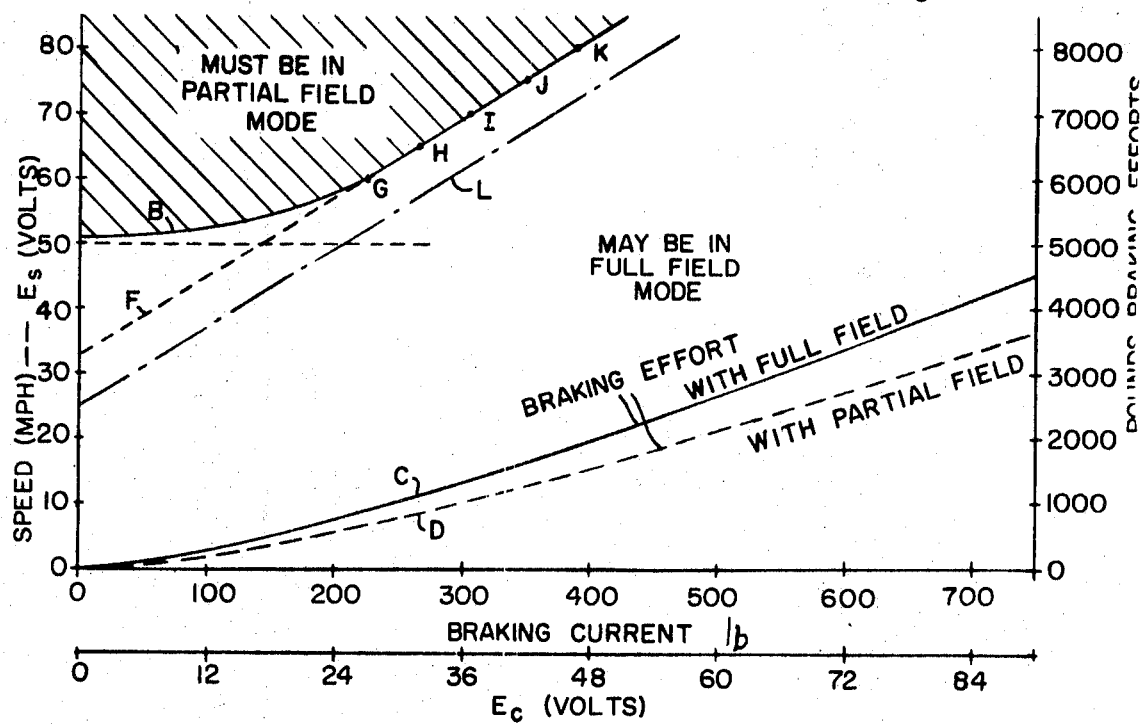

A curve C in FIG. 3 depicts the braking effort T provided by any given value of braking current $I_b$ for the system thus far described. The values indicated are by way of example for a particular set of equipment parameters. Thus in the example, 200 amperes produces about 750 pounds of braking effort, and 500 amperes produces about 2650 pounds of braking effort.

A full range of desirable braking effort includes low braking effort at the higher vehicle speeds. However curves B (FIG. 3) and $R_{max}$ (FIG. 2) say that low braking effort at speeds of above 50 m.p.h. cannot be obtained with the system so far described. For example the lowest braking effort obtainable at 80 m.p.h. is about 2000 pounds, and the lowest braking effort obtainable at 60 m.p.h. is about 900 pounds. From the curves of FIG. 2 it is apparent that the range of braking effort could be extended lower by increasing the value of $R_1$ for example to 2.32 ohms thus making $R_{max} = R_1 + R_2 = 2.32 + 0.68 = 3$ ohms. A load line representing such a value of $R_L$ would fall completely to the left of the 80 m.p.h. volt-ampere curve in FIG. 2. However as hereinbefore indicated the voltage developed across resistor $R_1$ would be higher necessitating higher rated chopper elements.

In accordance with the invention, the lower end of the braking effort range is extended by reducing the motor field flux per unit current $I_b$, at least when it is desired to operate within the shaded area above curve B in FIG. 3. It could be asked: Why not operate the system at all times with reduced field flux per unit current? A glance at curve D (FIG. 3) which represents braking effort with reduced field flux per unit current, indicates that for a given braking effort more current is required when operating with reduced field flux per unit current. In accordance with a further aspect of the invention, the motor field system is switched from one to the other of high and low field modes at appropriate times in response to vehicle speed and requested braking current $I_b$.

By way of example, the motor field system of a motor is switched from full field mode to partial field mode by shunting the motor field with an impedance element to bypass a portion of the armature current in the motor loop. More specifically motors M1 and M2 are provided with a field system 100 which includes the field windings F1 and F2, an impedance shunt 102 and a set of contacts 104 of a relay 106 for connecting the shunt 102 across the field windings when so desired.

The following convention is adopted in connection with switching devices such as relays 106 and 116, and later described elements 120 and 122. When the device is unenergized due to the absence of an external operating signal, it is in its "normal state" corresponding to the dropped-out state of an electromagnetic relay. Depending on purpose and design a switching device may be either open or closed in its normal state. This corresponds to normally open and normally closed contacts of an unenergized electromechanical (electromagnetic etc.) switch. However it is equally applicable to contactless switching devices such as solid-state devices, for example transistors, etc. When energized by an appropriate external signal the "contact status" of the switching device reverses from that of the normal state. "Open" is the reverse of "closed," and vice versa.

In the particular example, the arrangement is such that contacts 104 are closed when the relay is unenergized and open when the relay is energized. When the relay contacts 104 are opened, the field system 100 is placed in the full field mode in which all the current applied to the field system 100 flows through the field windings F1 and F2. On the other hand closing contacts 104 place the field system 100 in the partial field mode in which part of the current applied to the field system 100 bypasses the field windings F1 and F2 via the shunt 102. Thus for any given current supplied to the field system 100, the field strength will be greater for the full field mode than for the partial field mode.

In like manner motors M3 and M4 are provided with a field system 110 which includes the field windings F3 and F4, an impedance shunt 112, and a set of contacts 114 of a relay 116. As in the case of field system 100, the field system 110 is switched to full field mode when relay 116 is energized, and to the partial field mode when relay 116 is deenergized. The shunts 102 and 112 must be resistive, but may include inductance. The impedance value of the shunt may for example be such as to reduce the field strength about 35 percent from that of full field mode, so that per unit of current, field strength in partial field mode will be about 65 percent of that of the full field mode. The "translating" effect on the 80 m.p.h. curve in FIG. 2 may be noted by the 80 m.p.h. dashed curve which is the speed-ampere curve for 80 m.p.h. with partial field.

The status of the field systems 100 and 110 is controlled by a field status controller 118. In response to vehicle speed and braking current request, controller 118 controls the status of the field systems 100 and 110 in such manner that at any given speed the field systems 100 and 110 are caused to assume their partial field mode whenever the requested braking current is less than a predetermined value which is at least that obtainable at the given speed at full field when the average effective braking resistance is at its maximum. In the example, the maximum average effective braking resistance occurs when the chopper average ON time is at its minimum.

In the controller 118, items 120 and 122 are threshold response control devices having control input terminals 124 and 126 and output terminals 128 and 130 connected to a common output line 132 which in turn is connected to the operating coils of relays 106 and 116. An amplifier 133 may be inserted in line 132 if desired. Each of the devices 120 and 122 is operable in either of respective FIRST or SECOND modes depending on presence or absence of input signals above the response threshold of the device. Each of the devices 120 and 122 is arranged to assume its FIRST mode in the absence of input signals above its response threshold, and to assume its SECOND mode in the presence of input signals above its response threshold. Each of the devices 120 and 122 is arranged so that in the FIRST mode it supplies a control signal along output line 132 to energize relays 106 and 116, thereby to switch the field systems 100 and 110 to the full field mode. Thus if both control devices 120 and 122 are in their SECOND modes, relays 106 and 116 will not be energized in which case the field systems 100 and 110 will assume their partial field mode.

By way of example the control devices 120 and 122 are shown as including signal controlled switches 136 and 138 and Zener diodes 140 and 142 through which control signals are applied to the switches 136 and 138 for the control thereof. Switches 136 and 138 may for example be electromagnetic relays or electronic switches normally biased in the closed switch mode in the absence of input control signals that pass through their respective associated Zener diodes. The closed switch mode is symbolized by the closed switch symbols in the boxes 136 and 138. Each switch 136 and 138, in its closed mode, closes the circuit from a battery 146 to the output line 132, thus to apply the battery power to the output line 132. Each switch assumes its open mode in response to input signals applied to its associated Zener diode equal to or above the breakdown voltage of such diode. Since the power circuits of both switches 136 and 138 are in parallel, both must be in the open switch mode to disconnect the battery 146 from the output line 132. It should now be apparent that each of the threshold responsive control devices 120 and 122 may be a voltage sensitive electromagnetic relay with contacts that are closed when the relay is unenergized and open when the relay is energized. The breakdown voltage of Zener diode 142 will be referred to as $E_{z1}$, and that of Zener diode 140 as $D_{z2}$.

Speed signals $E_s$ representing vehicle speed are supplied to the controller 118 along a line 150 by a tachometer generator TG driven by the vehicle axle 12. A set of normally closed contacts A8 of relay A are inserted in line 150 to open that line when relay A is energized. By way of example, speed signals $E_s$ are in the form of a DC voltage applied in the positive sense to terminal 124 and an input terminal 152 of a summing device 154. A signal $E_c$ that is responsive to the braking current request is supplied to the controller 118 via a line 156 from the output line 82 of the load weight circuit 82. A set of normally closed contacts A9 of relay A are located in line 156 to open that line when relay A is energized. In the example, $E_c$ is a DC voltage proportional to desired braking current applied in the negative sense to another input terminal 158 of the summing junction 154. The output $E_n$ of the summing device, that is the algebraic sum of signals $E_s$ and $E_c$, is applied to the input terminal 126 of the control device 122.

In accordance with a major objective of the invention, the field systems 100 and 110 should be switched to partial field mode when at any given speed the value of requested braking current is less than a predetermined value that is not less than that obtainable with full field and maximum average effective braking resistance, that is when the chopper average ON time ratio is at the minimum, and to full field mode when at any given speed the requested value of braking current is greater than a predetermined value that is not less than that obtainable at the given speed with full field and maximum average effective braking resistance, that is when the chopper average ON time is at the minimum. This means that for the example generating characteristics shown in FIGS. 2 and 3, the apparatus should switch between field modes at least at the coordinates along the curve B (FIG. 3) to insure that operation in the area above curve B (shaded area) will be in the partial field mode. One way of accomplishing this is by linear response to the input signals so that the apparatus will be switched along a straight line m.p.h.-ampere curve, for example along a curve F (FIG. 3) which passes through points G, H, I, J, and K of curve B, and intercepts the m.p.h. axis (Y axis) at approximately 33 m.p.h., whereby the critical shaded area falls completely within the area above curve F, that is within the area between curve F and the m.p.h. axis above the 33 m.p.h. mark. This type of operation may be effected with the controller 118 minus the control device 120, and therefore operation of controller 118 without control device 120 in the circuit will be considered first. For this purpose it is assumed that the terminal 128 is disconnected from output line 132.

For convenience of explanation, the voltage $E_s$ proportional to vehicle speed is scaled 1:1 with the m.p.h. represented thereby, that is 1 volt per 1 m.p.h. so that the numerical index along the Y axis FIG. 3 represents both $E_s$ in volts and m.p.h. For example $E_s$ equals 10 volts at 10 m.p.h., 20 volts at 20 m.p.h., 30 volts at 30 m.p.h., etc.

To properly scale the voltage $E_c$ relative to $E_s$ and for linear response to the commanded (requested) braking current, it is useful to examine what must be accomplished by looking at a couple of random points on curve F. The coordinates of point G are 60 m.p.h. and 225 amperes. This means that at 60 m.p.h. the apparatus must be in partial field mode for requested braking current values below 225 amperes, and in full field mode for requested current values above 225 amperes. In order to effect these operations, the values of signals $E_s$ and $E_c$ must be such that the net signal $E_n$, applied by the summing junction 154 to the control input terminal 126 of control device 122, must be greater than the breakdown voltage $E_{zl}$ of Zener 42 for commanded braking current values below 225 amperes, and less than $E_{zl}$ for commanded current values above 225 amperes.

In like manner, examining point J on curve F it is seen that at 75 m.p.h. the apparatus must switch to full field mode at requested braking current values above 350 amperes and to partial field mode at requested current values under 350 amperes. Also at 75 m.p.h., the summation voltage $E_n$ must be greater than $E_{zl}$ for requested current values below 350 amperes and less than $E_{zl}$ for requested current values greater than 350 amperes.

The value for $E_{zl}$ and the scale factor for voltage $E_c$ may be determined in any suitable manner for example by calculating as follows.

Let $E_{zl}$ equal to $K_1$, and $K_2$ equal volts/ampere for $E_c$.

$$E_s = K_1 + K_2 I_b \quad (I)$$

at 75 m.p.h., $$75 = K_1 + K_2 (350) \quad (II)$$

at 60 m.p.h., $$60 = K_1 + K_2 (225) \quad (III)$$

Subtracting (III) from (II) leaves $$15 = K_2 (125)$$

$$K_2 = \frac{3}{25} = .12 \text{ volts/ampere scale factor for } E_c$$

Substituting 3/25 for $K_2$ in (III), gives $$K_1 = 33 = \text{voltage } E_{zl}.$$

Note also that 33 is the m.p.h. axis intercept of the straight line curve F.

Scaled in accordance with the above calculations, the values of $E_c$ are located next to the corresponding values of braking current in FIG. 3.

Looking at point G (FIG. 3) again, and assuming the values thus far determined, it is seen at 60 m.p.h., $E_s$ is equal to 60, and since $E_{zl}$ is equal to 33 volts, $E_c$ must be over 27 volts for control device 122 to assume the unenergized normally closed position illustrated, which switches the field systems 100 and 110 to full field mode as shown in FIG. 1. At 60 m.p.h., and when $E_c$ is 27 volts or less, $E_n$ is equal to or greater than $E_{zl}$ and control device 122 switches to the open mode thus switching the field systems 100 and 110 to the partial field mode by connecting the shunts 102 and 112 across their associated field windings. As seen from the charts in FIG. 3, a value of 27 volts for $E_c$ corresponds to approximately 225 amperes requested braking current. From this it is seen that at 60 m.p.h. the apparatus will operate in full field mode when the braking current request is above 225 amperes and in the partial field mode when the requested braking current is less than 225 amperes.

Taking another speed at random for example 40 m.p.h., it is seen from FIG. 3 that the value for $E_c$ on the curve F is approximately 7 volts, which corresponds to approximately 58 amperes braking current. At 40 m.p.h. when requested braking current is greater than 58 amperes, the following will obtain: $E_s = 40$, $E_c$ is greater than 7, $E_n = (E_s - E_c)$ is less than 33, control device 122 will be closed, and the field systems 100 and 110 will be in the full field mode (field windings unshunted). At 40 m.p.h. when requested braking current is less than 58, the following will obtain: $E_s = 40$, $E_c$ is less than 7, $E_n = (E_s - E_c)$ is greater than 33, and the field systems 100 and 110 will be switched to the partial field mode (field windings shunted).

If extra margin is desired, for example to accommodate hysteresis in the switching components, the switching curve F (FIG. 3) may be translated to a lower position for example the straight line curve L (shown in dot dash), and the value for $E_{zl}$ and the scaling for $E_c$ is recalculated in the manner outlined above. From the above description it is seen that regardless of which of the curves F or L is used as a switching curve, the switching between field modes for any given speed will take place when the requested braking current is above or below (as the case may be) a predetermined value which is not less than the value of braking current obtainable at the given speed and with full field and maximum effective average braking resistance in the circuit, that is when the average ON time of the chopper 20 is at the minimum. As is apparent from the curves F, L and a later described curve B, the "predetermined value" mentioned in the immediately preceding sentence increases as a function of speed increase. For example in curve L, the predetermined switching point for 40 m.p.h. is about 125 amperes; for 60 m.p.h. the switching point is about 280 amperes; and for 75 m.p.h. it is about 370 amperes. Thus the predetermined switching point increases as a function of speed increase. It should be understood that in practical apparatus some hysteresis is usually present.

In the foregoing description, which omits control device 120, control device 122 is shown as a normally closed switching device and contacts 104 and 114 are described as normally closed switching elements. This was done to make them compatible with control device 120 when used with the latter device in a later described operation. It should be understood that in the operation omitting the control device 120, the control device 130 and contacts 104 and 114 could all have been normally open switching elements, and still provide the previously described functions in accordance with the invention.

If desired, the operation of the apparatus thus far described may be altered to operate along a nonlinear switching curve for example like curve B (FIG. 3) by modifying $E_c$ with a function generator 160 to shape $E_c$ to conform to the nonlinear portions of the switching curve. Structural details and operation of suitable function generators are well known and need no elaboration. However it may be noted that a suitable function generator may be an operational amplifier whose gain varies as a desirable function of applied input signals. The function generator 160 may be switched into the $E_c$ line 156 by means of a double-throw switch 162.

In accordance with a further aspect of the invention, switching from full field to partial field may be inhibited below a selected vehicle speed regardless of the value of requested braking current by use of the control device 120 to modify operation of the controller 118. Considering now the full circuit of controller 118, that is, including both control devices 120 and 122 with their output terminals 128 and 130 connected to the output line 132. As hereinbefore indicated, control device 120 by way of example is functionally a normally closed signal-operated switching device which is closed in the presence of an external signal $E_s$ greater than the response threshold of the device 120, which threshold may be symbolized or represented by the breakdown voltage $E_{z2}$ of Zener diode 140. The response threshold of the control device 120, that is the voltage $E_{z2}$ is selected in accordance with the speed at which switching is to be limited. For example if the apparatus is to be inhibited from switching to partial field mode below vehicle speeds of 50 m.p.h., then the threshold response of control device 120, that is the Zener breakdown voltage $E_{z2}$, is selected to be 50 volts so that the control device 120 cannot be switched from the normally closed mode to the open mode unless the speed voltage $E_s$ is equal to or greater than 50 volts which of course corresponds to 50 m.p.h. With this arrangement, at speeds under 50 m.p.h. regardless of the value of $E_c$, there will be a closed circuit between battery 146 and operating coils of relays 106 and 116 to unshunt the field winding and effect full field mode operation. However, at speeds of 50 m.p.h. and above, the control device 120 will operate as an open switch since $E_s$ will be greater than $E_{z2}$.

At speeds below 50 m.p.h., the control device 120 will not operate as an open switch and consequently the apparatus will operate in the full field mode regardless of the value of requested braking current. However at speeds above 50 m.p.h. control device 120 will be open and the apparatus through control device 122 will operate along curve F as hereinbefore described. Thus at speeds below 50 m.p.h. all braking will be in the full field mode, while at 50 m.p.h. and above the decision between operation field modes will depend on both speed and value of requested braking current.

Figure 4:
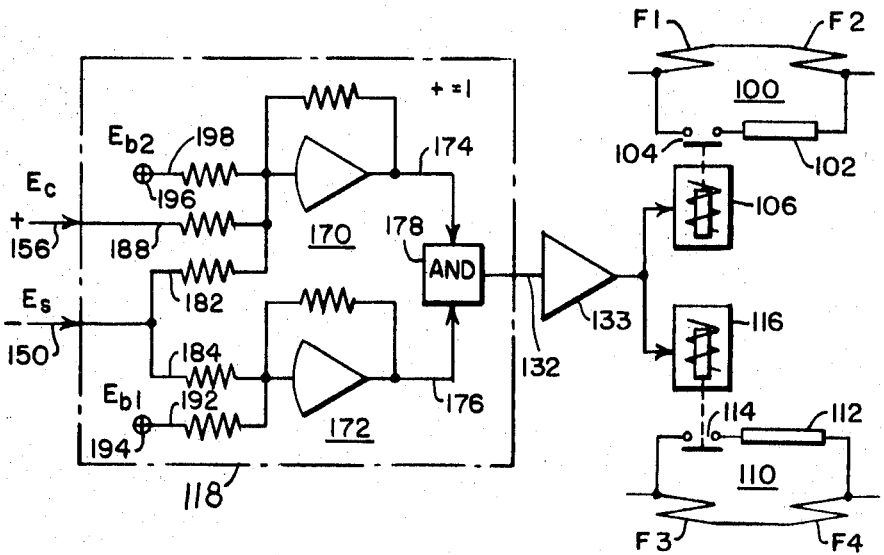
FIG. 4 is a diagram of an alternative field mode control for the system of FIG. 1.

At 118 in FIG. 4 there is shown an alternative example for the controller 118 of FIG. 1. With this arrangement substituted for the one shown at 118 in FIG. 1, relays 106 and 116 are constructed so that contacts 104 and 114 are normally open instead of normally closed as in FIG. 1. The controller 118 of FIG. 4 includes summing amplifiers 170 and 172 whose outputs 174 and 176 are connected to separate input terminals of an AND gate 178 whose output is connected to the output line 132, the latter line 132 being connected to the operating coils of relays 106 and 116 as in FIG. 1. Amplifiers 170 and 172 are inverting amplifiers, so that a net negative input provides a positive output and a net positive input provides a negative output. In the example the arrangement is such that positive output for each amplifier is a logical 1 while zero or negative output is a logical 0. Thus both amplifiers must have a positive output to cause the AND gate 178 to have an output logical 1. Also the arrangement is such that a 1 output from AND gate 178 is required to energize and operate relays 106 and 116 to close contacts 104 and 114.

To properly operate the embodiment of FIG. 4, the voltage $E_s$ on input line 150 is applied in negative polarity to summing input lines 182 and 184 of amplifiers 170 and 172, respectively. The voltage $E_c$ on line 156 is applied with positive polarity to a second summing input 188 of amplifier 170. For inhibiting operation in the partial field mode at speeds below a selected speed, a positive bias voltage $E_{b1}$ having a value in accordance with the selected limiting speed is applied to a second summing input 192 of amplifier 172 from a suitable bias source 194. For example, for inhibiting partial field mode operation at speeds under 50 m.p.h., the selected bias $E_{b1}$ to be applied on input line 192 is 50 volts. With amplifier 172 so biased, it cannot produce a 1 output at speeds under 50 m.p.h. As a consequence AND gate 178 cannot produce a 1 output no matter what happens in amplifier 170, and contacts 104 and 114 cannot be closed to shunt the field windings.

Amplifier 170 is arranged to operate along the switching curve F at speeds of 50 m.p.h. and above by applying a positive bias voltage $E_{b2}$ of 33 volts from a source 196 to a third summing input terminal 198 of amplifier 170. With amplifier 170 so biased it cannot produce a logical 1 output on its output line 174 if the quantity $E_s - E_c$ is less than 33. However as soon as the quantity $E_s - E_c$ becomes greater than 33, the amplifier 170 output on line 174 will be positive and thus a logical 1.

From the above it is seen that at speeds of 50 m.p.h. or higher, amplifier 172 will produce a 1 on its output line 176 while amplifier 170 will produce a 0 on its output line 174 if the value of requested current is greater than that defined by curve F for a given speed. As a result relays 106 and 116 are not energized and the apparatus is in the full field mode. On the other hand, if the value of commanded braking current is less than that defined by curve F at the given speed, amplifier 170 will produce a 1 on its output line 174, and with a 1 on both of its input lines, AND gate 178 will produce a 1 output to energize relays 106 and 116 to switch the field systems 100 and 110 to the partial field mode. For example at 60 m.p.h. amplifier 172 will produce a 1 on its output line 176 while amplifier 170 will produce a 0 on its output line 174 for requested braking current values above 225 amperes, and a 1 on the output line 174 when the requested braking current values are 225 amperes or less. Thus at 60 m.p.h. the apparatus will be switched to the full field mode when requested braking current values are greater than 225 amperes, and to the partial field mode when the requested braking current values are 225 amperes or less.

It may be noted that similar considerations and techniques may be employed for determining the values of $E_{b1}$ and $E_{b2}$ as were described for determining the values $E_{z2}$ and $E_{z1}$ in the control elements 120 and 122 of FIG. 1.

All references to vehicle speed herein are based on a fixed relation between motor speed and vehicle speed at all times. Thus m.p.h. is representative of motor speed at the indicated vehicle speed for fixed mechanical parameters such as wheel diameter, gear ratio, etc. It should be noted that the tach generator TG always measures motor speed directly without regard to skidding or changing wheel diameter as from wear. Thus all references to speed herein may be considered as motor speed, and voltage $E_s$ may just as properly be considered to represent either motor speed or vehicle speed.

The invention is equally applicable to a motor system having a single motor with a braking resistor connected thereacross as it is to the multimotor system with a braking resistor connected thereacross as described herein. In fact the multimotor system shown may be considered as a single motor system.

It should be understood that the specific embodiments illustrated herein are by way of example only and are not to be construed as limiting the invention thereto.

We claim:

1. In a dynamic braking system for a motor circuit including motor means and dynamic braking means connected thereacross and which braking means is adjustable to vary its effective resistance between predetermined minimum and maximum values whereby the braking motor current may be varied between predetermined maximum and minimum values for any given motor speed, and wherein there is selecting means for commanding a value of motor current corresponding to a desired braking effort, said braking means being adjustable in response to said selection means:
   a. motor field means operable in respective high and low modes and providing greater field strength in the high mode than in the low mode for a given current;
   b. first signal providing means for providing a first signal that is a function of the braking current command;
   c. second signal providing means for providing a second signal that is a function of motor speed; and
   d. control means for controlling the status of said field means, said control means comprising means for comparing said first and second signals and providing certain conditions in response to predetermined relations between said signals, and means responsive to said certain conditions for
      1. causing said field means to assume its low mode when, at any given speed within a predetermined speed range, the braking current command is less than a predetermined current value that increases as a function of speed increase, and
      2. causing said field means to assume its high mode when, at any given speed within said speed range, the braking current command is greater than a certain current value that increases as a function of speed increase.

2. The combination as in claim 1 wherein said control means includes means for inhibiting operation of said field means in its low mode when the motor speed is below a predetermined value.

3. The combination as in claim 1 wherein said motor circuit is a traction motor circuit in a vehicle, and said motor means includes at least one traction motor coupled to a driving axle of the vehicle.

4. The combination as in claim 2 wherein said motor circuit is a traction motor circuit in a vehicle, and said motor means includes at least one traction motor coupled to a driving axle of the vehicle.

5. The combination as in claim 1 wherein said dynamic braking means comprises resistor means and a controllable chopper connected across at least a portion of said resistor means.

6. The combination as in claim 1 wherein said field means includes a field winding and a shunt, and wherein said control means comprises:
   a. First switching means which assumes a first state when the motor speed is above a predetermined speed, and a second state when the motor speed is below said predetermined speed;
   b. Second switching means which assumes a first state when at any given speed above said predetermined speed the braking current command is less than said predetermined current value, and a second state when at any given speed above said predetermined speed the braking current command is greater than said certain current value; and
   c. shunt control means which in a first state connects said shunt across said field winding and in a second state unshunts said field, said shunt control means assuming its first state in response to both said first and second switching means being in their first states, said shunt control means assuming its second state in response to at least one of said first and second switching means being in its second state.

7. The combination of claim 6 wherein said motor circuit is part of a vehicle traction system, and said motor means includes at least one motor coupled to an axle of the vehicle.

8. The method of controlling a motor system in the dynamic braking mode, which system includes a motor and dynamic braking means connected thereacross and which braking means is adjustable to vary its effective resistance between minimum and maximum values whereby the braking current may be varied between predetermined maximum and minimum values for any given motor speed, and wherein there is selecting means for requesting a value of braking current corresponding to a desired braking effort, said braking means being adjustable in response to said selection means, and wherein said motor has a field winding, said method comprising the steps of utilizing respective signals that are a function of speed and a function of requested value of braking current to operate motor field in partial field mode when at any given motor speed the requested value of braking current is less than a predetermined current value that is not less than the braking current obtainable at the given speed with the motor in full field mode and the average effective resistance of said braking means at said predetermined maximum resistance value, and to operate the motor field in full field mode when at any given speed, the requested value of braking current is greater than a certain current value that is not less than the braking current obtainable at that speed with the motor in full field mode and the average effective braking resistance at said predetermined maximum resistance value.

9. The combination as in claim 6 wherein said dynamic braking means comprises resistor means and a controllable chopper connected across at least a portion of said resistor means.

10. The combination as in claim 9 wherein said motor circuit is a traction motor circuit in a vehicle, and said motor means includes at least one traction motor coupled to a driving axle of the vehicle.

11. The combination as in claim 1 wherein said control means comprises:
   a. First switching means which assumes a first state when the speed of said motor means is above a predetermined speed, and a second state when the speed of the motor means is below said predetermined speed;
   b. Second switching means which assumes a first state when at any given speed above said predetermined speed the command current is less than said predetermined current value, and a second state when at any given speed above said predetermined speed the commanded current is greater than said certain current value; and
   c. mode control means for (a) causing said field means to assume its low mode in response to both said first and second switching means being in their first states, and (b) causing said field means to assume it is high mode in response to at least one of said first and second switching means being in its second state.

12. The combination as in claim 11 wherein said motor circuit is a traction motor circuit in a vehicle, and said motor means includes at least one traction motor coupled to a driving axle of the vehicle.

13. The combination as in claim 11 wherein said dynamic braking means comprises resistor means and a controllable chopper connected across at least a portion of said resistor means.

14. The combination as in claim 13 wherein said motor circuit is a traction motor circuit in a vehicle, and said motor means includes at least one traction motor coupled to a driving axle of the vehicle.

15. The combination as in claim 5 wherein said motor circuit is a traction motor circuit in a vehicle, and said motor means includes at least one traction motor coupled to a driving axle of the vehicle.

16. The method of claim 8 wherein said predetermined current value increases as a function of motor speed increase, and said certain current value increases as a function of motor speed increase.

17. The combination of claim 6 wherein each of said first and second switching means comprises a summing amplifier.

18. The combination of claim 11 wherein each of said first and second switching means comprises a summing amplifier.

19. The combination as in claim 1 wherein said predetermined current value of clause D1 is not less than the value of braking current obtainable at the given speed of clause D1 and in high field mode when the average effective making resistance is at said predetermined maximum resistance value, and wherein said certain current value of clause D2 is not less than the value of braking current obtainable at the given speed of clause D2 and in high field mode when the average effective braking resistance is at said predetermined maximum resistance value.

20. The method of controlling a motor system in the dynamic braking mode, which system includes a motor and dynamic braking means connected thereacross and which braking means is adjustable to vary its effective resistance between minimum and maximum values whereby the braking current may be varied between predetermined maximum and minimum values for any given motor speed, and wherein is selecting means for requesting a value of braking current corresponding to a desired braking effort, said braking means being adjustable being adjustable in response to said selection means, and wherein said motor has a field winding, said method comprising the steps of utilizing respective signals that are a function of speed and a function of requested value of braking current to operate motor field in partial field mode when at any given motor speed within a predetermined speed range the requested value of braking current is less than a predetermined value that increases as a function of speed increase, and to operate the motor field in full field mode when at any given speed within said speed range, the requested value of braking current is greater than a certain value that increases as a function of speed increase.